G. R. MURRAY.
AUTOMATIC WORK REGISTER.
APPLICATION FILED MAR. 6, 1911.
1,132,110.
Patented Mar. 16, 1915.
3 SHEETS—SHEET 2.
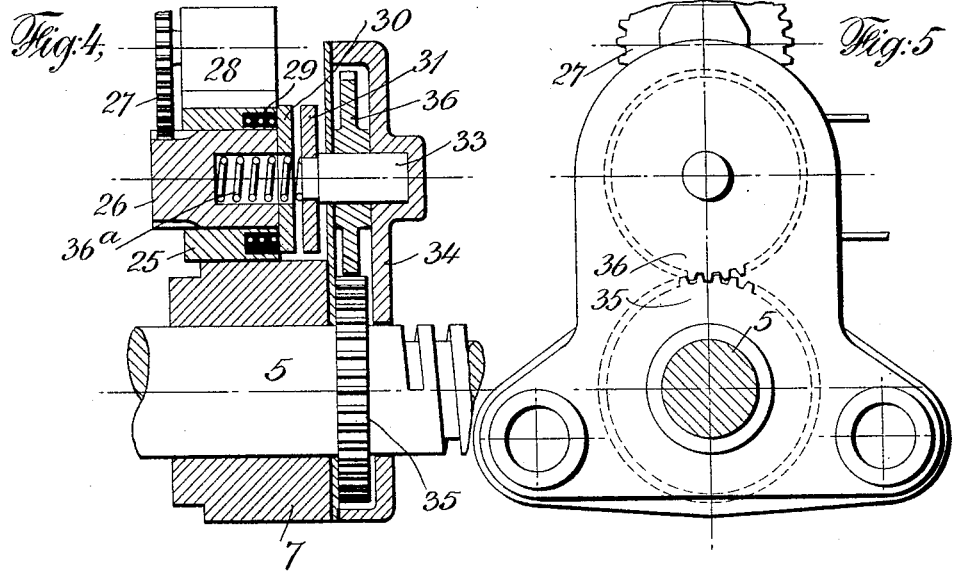
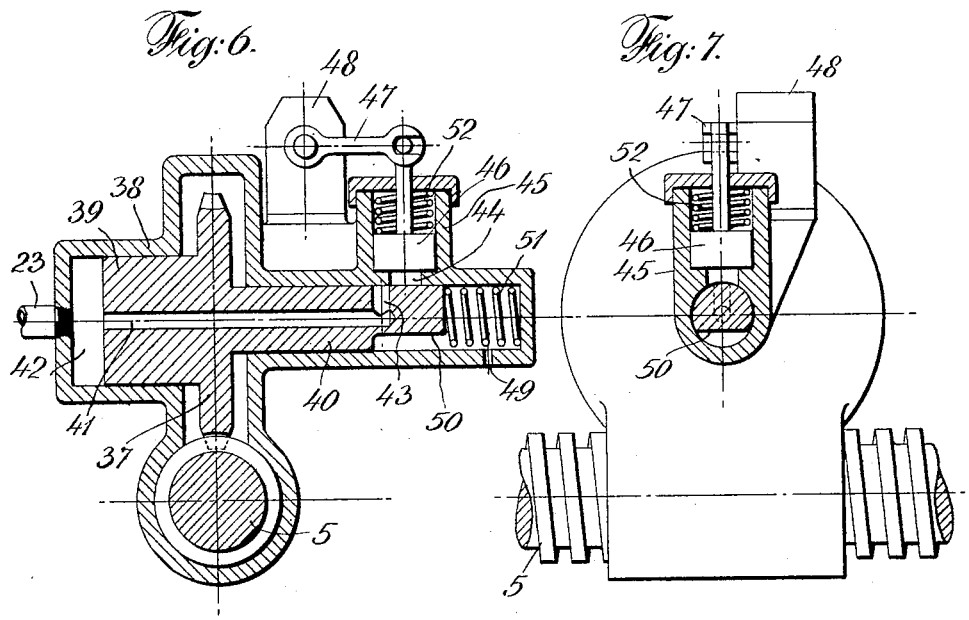
WITNESSES:
Max B. A. Doring
Paul H. Frank
INVENTOR
George R. Murray
BY
Marble & Matter
ATTORNEYS G. R. MURRAY.
AUTOMATIC WORK REGISTER.
APPLICATION FILED MAR. 6, 1911.
1,132,110.
Patented Mar. 16, 1915.
3 SHEETS—SHEET 3.
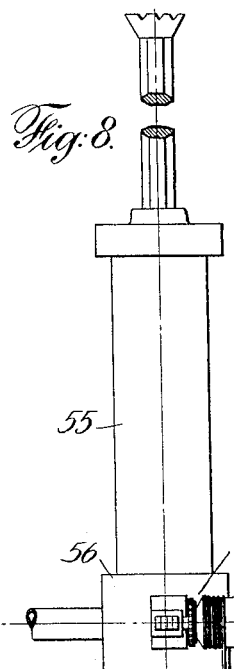
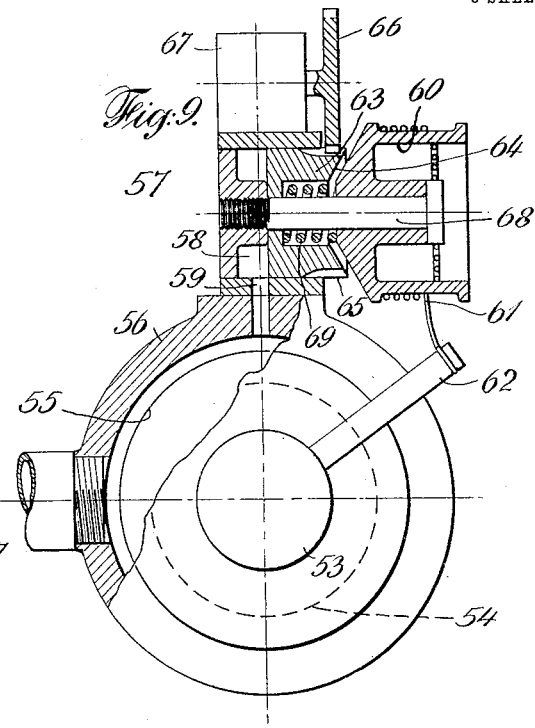
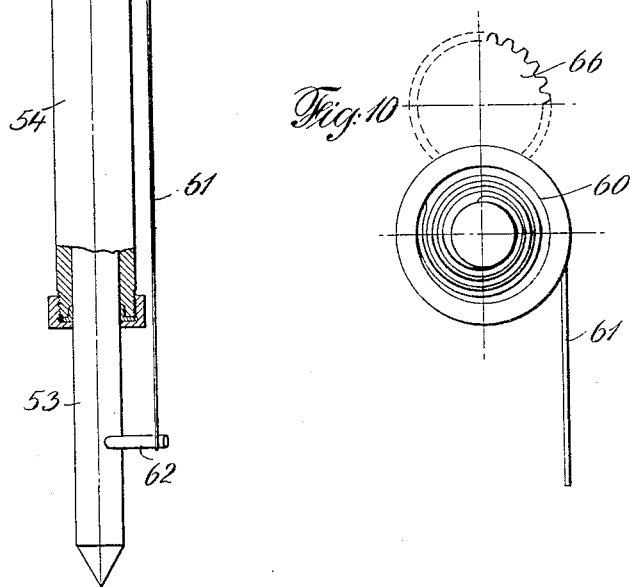
WITNESSES:
Max B. A. Doring
Paul H. Frank
INVENTOR
George R. Murray
BY
Marble & Matty
ATTORNEYS

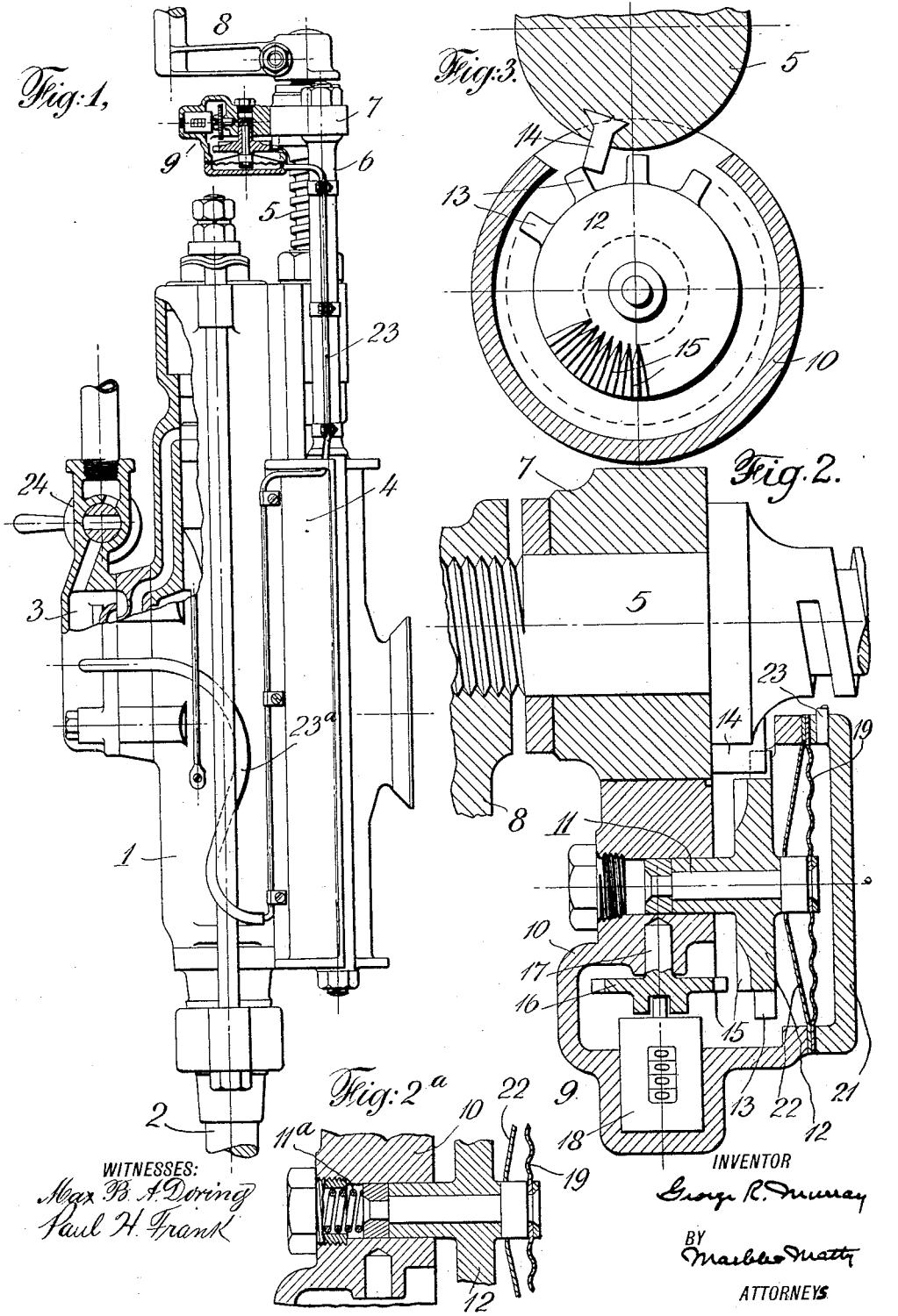

UNITED STATES PATENT OFFICE.

GEORGE R. MURRAY, OF CLEVELAND, OHIO.

AUTOMATIC WORK-REGISTER.

1,132,110.  Specification of Letters Patent. Patented Mar. 16, 1915.

Application filed March 6, 1911. Serial No. 612,621.

*To all whom it may concern:*

Be it known that I, GEORGE R. MURRAY, a citizen of the United States of America, and a resident of Cleveland, in the county of Cuyahoga and State of Ohio, have invented certain new and useful Improvements in Automatic Work-Registers, of which the following is a specification.

My invention relates to automatic means for measuring the work done by various types of machines, and comprises means particularly adapted and intended for registering automatically the work done by a rock drill or like machine; but while my said device is primarily intended for use on rock drills, and like machines, it is by no means limited to use on such machines, but is adapted for use generally on machine tools and other machines driven by fluid-pressure, or by fluid pressure motors, or by electric current or by electric motors.

My invention comprises means for registering the movement of a movable member, combined with means for preventing such registering when the machine is idle, that is to say, when it is not actually performing work. For example, in the case of a rock drill, my register is primarily intended to be arranged to register the distance traveled, in a forward direction, by the cylinder or other main traveling part of the motor of the drill; but obviously idle movements of such cylinder or other main traveling part should not be registered, otherwise movements which are merely for the purpose of inspection or for preadjustment might be registered as if they were part of the actual work performed by the drill. Likewise, if such idle movements were registered, the drill attendant might operate the register by merely moving the drill cylinder or like traveling part, forward and backward, during times when the drill was doing no work. To insure that the recorder shall be operated only by movements occurring while the drill or other machine is actually working, I provide means whereby the register is rendered operative only when the drill or other machine is under power; that is to say, in the case of a pneumatic or steam drill, when the operating fluid is being admitted under pressure, to the drill cylinder; and in the case of an electric drill, only when current is being supplied to the motor of that drill. Therefore the register is caused to furnish an accurate cumulative measurement of the work actually done by the machine.

It will be obvious that reliable automatic measurement of work actually done is extremely desirable, not only as a means for automatically measuring the progress of the work, but, and primarily, as a means upon which to base the payment for the work, and as means for accurately comparing the capacities of different sizes, types and makes of drills and other machines, and for comparing capacity and efficiency of different operators.

The objects of my invention therefore are to measure automatically and cumulatively the work actually done by a rock drill or other machine tool, omitting from the measurement return movements, idle movements, etc., to so design and arrange a register that it may not be tampered with readily and that it may be so mounted upon a drill or other machine as not to be liable to mechanical injury, in ordinary use, and to adapt the register to use upon machines operated either by fluid pressure or electricity.

I will now proceed to describe my invention with reference to the accompanying drawings, and will then point out the novel features in claims.

In said drawings, Figure 1 shows a side elevation and partial section of a conventional type of pneumatic or steam rock drill with my register fitted thereto, the said register being shown in section. Fig. 2 shows a longitudinal sectional detail view, on a larger scale, of the register and of the adjacent portion of the drill. Fig. 2ᵃ is a detail view illustrating the use of a spring to resist pressure on the diaphragm. Fig. 3 is a detail sectional view illustrating the action of the register. Fig. 4 shows a longitudinal section of an alternative form of register adapted for use on an electrically driven machine tool; and Fig. 5 shows a front elevation of such alternative form of register. Fig. 6 is a longitudinal sectional view of a further form of register adapted for use on drills and other tools operated by fluid pressure; and Fig. 7 shows a transverse section of such alternative form of register. Fig. 8 shows an elevation and partial section of a further type of drill having applied thereto a further form of register, the particular drill illustrated being a hammer drill of the pressure feed type, and the particular form of register shown thereon being especially adapted for use on such types of drills, though also adapted for use on other types of drills and on other machines. Fig. 9 shows an end view and partial section of this drill and a section of the register, the section of the drill being taken through the valve chest thereof. Fig. 10 shows an end view of the register shown in Figs. 8 and 9.

Referring first to Figs. 1, 2 and 3, numeral 1 designates the cylinder of a conventional type of rock drill, 2 designates the piston rod thereof, 3 the valve chest thereof, 4 the guide through which the said cylinder slides longitudinally, 5 the customary feed screw, 6 one of the customary standards or yoke supporting rods, 7 the customary yoke or crosshead connecting the rods 6 on opposite sides of the machine, through which yoke the feed screw 5 passes, and 8 designates the customary crank arm on the end of the feed screw, for rotating said screw to move cylinder 1 forward and backward. All these parts may be of customary construction. The register 9 is, in this construction, mounted upon the yoke 7, and comprises a main casing member 10 having mounted in a bearing within it a spindle 11 having upon it a toothed operating wheel 12 provided with peripheral teeth 13 adapted to be engaged by a tooth 14 provided on the feed screw 5, and further provided with face teeth 15 adapted to engage the teeth of a counting wheel 16, the spindle 17 of which is likewise mounted in a bearing, in the casing 10; to which counting wheel 16 an ordinary mechanical counter 18 is connected in such manner that when the counting wheel 16 is rotated the said counter 18 registers the rotations of wheels 16. Mechanical counters such as 18 are well known and it is not considered necessary to illustrate or describe here the particular details of construction of such a counter.

Normally, the face teeth 15 of the gear 12 are not in mesh with the teeth of counting wheel 16. Said gear 12 is movable axially within the casing 10 into and out of engagement with wheel 16, such movement being effected by fluid pressure acting upon a diaphragm 19 located within a diaphragm chamber 20 formed in the casing 10, the said casing comprising, in addition to its main member, a diaphragm cap 21. A shield 22 is provided within the diaphragm chamber, to prevent injury to the diaphragm by dust, chips, or the like, which may enter the small opening in the casing member 10 through which the tooth 14 of the feed screw 5 travels. The shield 22 supports the diaphragm against over-pressure. It will be noted (see particularly Fig. 1) that this opening is on the side of the casing 10 nearest the yoke 7 and in all ordinary positions of the drill 1 this opening is on the lower side of the casing, so that it is very improbable that chips or the like will enter said opening.

The diaphragm chamber is connected by a pipe or duct 23, with the valve chest 3 of the drill, a portion 23$^a$ of this duct being preferably a rubber hose, or other flexible tube, permitting free motion of the drill cylinder 1 with reference to its guide and support 4 without disturbing the connection between the valve chest and the diaphragm chamber. The diaphragm 19 preferably has sufficient spring-power to withdraw the gear 12 from engagement with the gear 16 when there is no pressure in the diaphragm chamber; that is to say, when the throttle 24 of the drill is closed.

The operation of this register, as shown in Figs. 1, 2 and 3, is as follows: When the throttle 24 of the drill is opened to set the drill in operation, pressure is communicated from the valve chest 3 through duct 23 to diaphragm chamber 20, thereby causing the diaphragm 19 to move the gear 12 into engagement with the gear 16. Rotation of the feed screw 5 of the drill, to advance the drill as the work progresses, will then cause rotation of the gears 12 and 16, and the operation of the counter 18. When the cylinder 1 has reached the forward limit of its motion, the operator of course closes the throttle 24, whereupon the diaphragm 19 withdraws gear 12 from engagement with gear 16, so that during the subsequent retraction of the drill cylinder by reverse rotation of the feed screw 5, the counter is not affected. Upon the next forward or working motion of the cylinder 1, the throttle 24 being again opened, pressure is again communicated to the diaphragm, and gears 12 and 16, are again caused to engage, the counter 18 being then operated as before. It will be seen therefore that the counter 18 registers all forward working motions of cylinder 1 but does not register the idle backward motions of said cylinder. Likewise, it does not record idle forward motions of the cylinder 1, that is to say, motions effected when there is little or no working fluid admitted to cylinder 1, because as these drills are constucted, the drill cannot be worked idly under working pressure, or anything approximating working pressure, without destruction of the drill itself; and the diaphragm 19 preferably has such stiffness that a very low pressure, such as might be used to reciprocate the drill piston idly, without damage to the drill itself, will not deflect the diaphragm sufficiently to bring gears 12 and 16 into engagement. Thereby the drill attendant is prevented from producing a false indication of work performed by keeping the drill in idle operation, and working the cylinder back and forth.

Customarily but one tooth 14 on the feed screw 5 is desirable, it being desirable to have a considerable reduction in speed of rotation between said feed screw and gear 12; but of course the provision of further teeth 14 on the feed screw would be a mere duplication and would be within my invention. The location of the register 9 upon the yoke 7 is such that the register is substantially protected from injury under all ordinary circumstances, by the parts of the drill itself. The location is also one permitting a rugged construction of the register. My register does not require changes in the construction of drills of standard types, other than the provision of a tooth 14 on the feed screw, the boring of a hole in the valve chest for connection of the duct 23 thereto, and the provision of simple means, such as illustrated, for securing the duct 23 to the drill. All of these changes are readily made at very slight expense.

As shown in Fig. 2$^a$, a spring 11$^a$ may be employed, either to supplement the spring action of the diaphragm 19, or, if desired, to permit the use of the diaphragm having little or no spring action.

The alternative construction illustrated in Figs. 4 and 5, is particularly adapted for use on electric rock drills and other machine tools operated by electric power. In these views, 5 designates as before, the feed screw of the drill or other tool, 7 a yoke or other frame member of such tool, and 25 a frame member of the register, within which is mounted a gear 26 having teeth intermeshing with the teeth of a gear wheel 27 of a mechanical counter 28. Said frame member 25 also constitutes the magnet of a magnetic clutch, 29 designating the magnet coils thereof, and 30 the pole piece. 31 designates the armature of the clutch, mounted upon a spindle 32, itself mounted in a gear case 34 secured to the yoke 7 of the drill or other machine tool. Inside this gear case is a gear 35 on the feed screw 5 and a gear 36 on the spindle 33. The magnet coils 29 of the magnetic clutch are intended to be included, directly or in shunt, in the main circuit of the drill or other machine tool. It will be seen that when current is flowing through said coils the armature 31 of the clutch will be attracted to the pole piece 30 so that when feed screw 5 is rotated, so causing the rotation of spindle 33, gear 26 will also be rotated, either by magnetic drag or by frictional engagement of armature 31 with pole piece 30; while when current is cut off rotation of feed screw 5 will cause no rotation of gear 26, because at such times the magnet coils of the clutch are not energized. A spring 36$^a$ tends to retract the armature upon demagnetization of the clutch magnet.

Figs. 6 and 7 illustrate a further alternative type of register, adapted for use on drills and other machine tools operated by fluid pressure. In these views, as in the preceding views, 5 designates the feed screw, 37 designates a worm wheel, meshing with the threads of this feed screw, and mounted within a casing 38 supported upon some convenient part of the drill or other machine. This worm wheel 37 is provided with extended hub bosses 39 and 40 and has a central duct 41 communicating at one end with a pressure chamber 42 in casing 38, said duct 41 being provided at its opposite end with a lateral port 43 adapted to register with a port 44, in the side of the casing 38, communicating with a cylinder 45 within which is a piston 46 having a connection by means of a link 47 with a mechanical counter 48. 49 is an escape port in the end portion of the casing 38. Opposite port 44 the hub portion 40 has a flattened portion 50 which, when adjacent the port 44, permits exhaust of working fluid from cylinder 45 to escape port 49. A spring 51 tends to press the worm wheel 39 to the left (as viewed in Fig. 6). The operation of this device is as follows: Normally, that is to say, when the drill or other machine tool is not doing actual work, port 43 of the worm wheel 39 is not in registry with port 44 leading to cylinder 45; and the pressure exerted by the spring 51 is such as to prevent port 43 registering with port 44, even though sufficient pressure be admitted to chamber 42 to operate idly the drill or other machine to which this register is connected. Therefore, when such drill or other machine is idle, or is merely working idly, the register is not operated. But when such drill or other machine is in useful operation, pressure, admitted to chamber 42 through the pipe 23, forces the worm wheel 37 to the right (of Fig. 6) causing the port 43 of the duct of said worm wheel to register with port 44, once during each rotation of the worm wheel. During each such registry of the ports, the fluid under pressure is admitted to cylinder 45, raising the piston 46 and so causing the arm 47 to actuate the counter 48; while as soon as the port 44 communicates with port 49 the piston 46 falls (being depressed by its spring 52). It will be obvious that the register 48 is one of a type well known, adapted to be operated by oscillation of a lever, such as lever 47. It will be seen that by this construction, said counter 48 is caused to register each rotation of the worm wheel 37, while the drill, or other machine tool to which the register is applied, is performing work.

In Figs. 8, 9 and 10 I illustrate a further form of my recorder, applied in this case to a drill of the pressure feed type; that is to say, a drill the feeding forward of which is performed automatically by fluid pressure exerted up a suitable feed piston 53. 54 designates the feed cylinder, 55 the main or drill cylinder, and 56 the customary valve chamber. Drills of this type are well known and it is not necessary for me to illustrate in detail structures of such drills. The particular drill illustrated is one of the "hammer" type in which, as the depth of the hole drilled increases, the cylinder gradually moves forward. 57 designates my register, mounted upon a convenient portion of the drill, as, for example, on the valve chest, and comprising a pressure cylinder 58 (Fig. 9) connected by a port 59 to the interior of the valve chamber; and comprising also a spring actuated winding drum 60 connected by a cord 61 to a projection 62 of the feed piston 53; and the register further comprises a combined piston and gear 63 located within cylinder 58 and having a coned clutch surface 64 adapted to engage with a similar surface on the winding drum 60 and having, furthermore, gear teeth 65 adapted to engage the teeth of the driving wheel 66 of a mechanical counter 67. The winding drum 60 is mounted upon a stud 68. A spring 69, between said winding drum and the piston 63, tends to keep said piston 63 out of driving engagement with winding drum 60; but when working pressure is on the drill such pressure, communicated through the valve chest 56 to pressure cylinder 58, presses piston 63, against the action of the spring 69, into frictional engagement with the coned surface of winding drum 60; and as the drill cylinder 55 advances, and the cord 61 is unwound, from drum 60, so causing revolution of said drum, such revolution is communicated to the piston 63 and thence to the driving gear 66 of the mechanical counter 67. In this register, as in those previously described, idle movements or return movements do not affect the register, because during such movements there is not sufficient pressure in cylinder 58 to hold the piston gear 63 in driving engagement with drum 60.

It will be obvious that my invention is susceptible of embodiment in numerous forms, differing considerably in construction, but all embodying the same generic feature, namely, a register or counter arranged to be actuated by movement of some moving part of the tool or machine to which the register is applied, combined with means for avoiding operation of such counter during idle periods of the tool or machine, that is to say, periods when the tool or machine is either not in operation, or, if in operation, is operating idly.

In the phrase "power-operated controlling means" contained in one of the following claims, I use the term "power" in a sense in which it is often used in engineering, to designate the energy of a motive fluid, either tangible or intangible; steam, compressed air, water under pressure, etc., being examples of a tangible fluid, and an electric current, so called, being an example of an intangible fluid. In other words, the term power is used as approximately synonymous with driving energy.

What I claim is:—

1. A register of the class described, comprising counting means, and operating means therefor arranged to be operated by a movable member of a fluid-pressure-actuated machine to which the register is applied, such operating means comprising fluid-pressure-controlled power-transmitting means, adapted to be connected to the source of supply of fluid pressure for such tool or machine, and arranged to disconnect the counter from such operating means during idle periods.

2. The combination with a fluid-pressure-actuated machine tool comprising a movable member, of a register comprising counting means, and operating means therefor arranged to be operated mechanically by the movable member of said machine tool, such operating means comprising fluid-pressure-controlled power-transmitting means, connected to the source of supply of fluid pressure for such tool or machine, and arranged to disconnect the counter from such operating means during idle periods.

3. The combination with a fluid-pressure-actuated machine tool comprising a movable member and a valve chest, of a register comprising a counter, and operating means therefor arranged to be operated by said movable member of the machine tool, and comprising fluid-pressure-operated controlling means connected to said valve chest, and arranged to disconnect the counter from such operating means during idle periods.

4. The combination with a fluid-pressure-actuated machine tool comprising a movable member and a valve chest, of a register comprising counting means, and operating means therefor arranged to be operated by the movable member of said machine tool, such operating means comprising fluid-pressure-controlled power-transmitting means, connected to the valve chest of the machine tool, and arranged to disconnect the counter from its operating means during idle periods.

5. The combination with a machine tool comprising a valve chest and a movable member, of a register comprising counting means, and operating means therefor arranged to be operated by the said movable member of the machine tool, such operating means comprising a diaphragm chamber and diaphragm therein, said diaphragm chamber connected to said valve chest, and means operated by the diaphragm arranged to permit operation of the counter when said valve chest is under working pressure, and to prevent operation of the counter when said chest is under less than working pressure.

6. The combination with a machine tool comprising a feed screw and a valve chamber, of a register comprising counting means, and operating means therefor arranged to be operated by rotation of said feed screw, such operating means comprising fluid-pressure-controlled means connected to said valve chamber and arranged to permit operation of the counter when said valve chest is under working pressure, and to prevent operation of the counter when said chest is under less than working pressure.

7. The combination with a power-operated machine tool, comprising a feed screw, of a register comprising a counter and operating means therefor arranged to be operated by rotation of such feed screw, such operating means comprising controlling means for stopping operation of the counter during idle periods of the tool.

8. The combination with a power-operated machine tool, comprising a feed screw, of a register comprising a counter and operating means therefor arranged to be operated by rotation of such feed screw, such operating means comprising controlling means operated by variation in the supply of driving energy to such machine tool for avoiding operation of the counter during idle periods of the machine tool.

9. The combination with a power-operated machine tool, comprising a feed screw, of a register comprising a counter and operating means therefor arranged to be operated by rotation of such feed screw, such operating means comprising controlling means operated by the supply of driving energy to, or cutting off of driving energy from, the machine tool, for causing operation of the counter when the machine is in operation, and for stopping operation of the counter when power is cut off from the machine tool.

10. The combination with a machine tool comprising a valve chest and a feed screw, of a register mounted upon such machine tool in driving proximity to the feed screw thereof, and comprising a counter, and operating means therefor arranged to be operated by rotation of said feed screw, and fluid-pressure operated controlling means connected to the valve chest and arranged to operatively connect such operating means with said counter, when the valve chest is under working pressure, and to disconnect such operating means from the counter when the valve chest is under less than working pressure.

11. The combination with a machine tool, comprising a feed screw and a yoke through which said feed screw passes, and further comprising means controlling the supply of driving energy, of a register mounted upon the said yoke, and comprising a counter and operating means therefor arranged to be operated by rotation of said feed screw, and further comprising controlling means controlled by the source of driving energy of said machine tool and arranged to prevent operation of the counter when such driving energy is cut off from the machine tool.

12. The combination of a machine tool, comprising a cylinder, a valve chest, a guide for the cylinder, a feed screw, and a yoke through which the feed screw passes, of a register mounted upon said yoke, and comprising a counter and operating means therefor comprising a driving gear, said feed screw comprising means arranged to rotate said driving gear, said register further comprising fluid-pressure-operated means connected to said valve chest and arranged to prevent operation of the counter by said driving gear when said valve chest is under less than working pressure.

13. A register of the class described comprising in combination a frame, a counter secured thereto, a driving gear mounted on said frame and arranged to be moved axially therein, fluid-pressure-operated controlling means for so moving said driving gear, and a gear wheel in driving connection with said counter arranged to engage with teeth of said driving gear when the latter is at one limit of its movement.

14. A register of the class described comprising in combination a frame, a counter secured thereto, a gear wheel connected to said counter, a driving gear therefor mounted on said frame and axially movable into and out of engagement with said first-mentioned gear, and fluid-pressure-operated controlling means for so moving said driving gear, comprising spring means for moving said driving gear out of engagement with the first-mentioned gear.

15. A register of the class described comprising in combination a frame, a counter secured thereto, a gear wheel connected to said counter, a driving gear therefor mounted on said frame and axially movable into and out of engagement with said first-mentioned gear, a diaphragm chamber and a diaphragm therein for so moving said driving gear, and a diaphragm shield in coöperative proximity to the diaphragm to support same against over-pressure.

16. A register of the class described comprising in combination a frame, a counter secured thereto, a gear wheel connected to said counter, a driving gear therefor mounted on said frame and axially movable into and out of engagement with said first-mentioned gear, and comprising face teeth for engagement with teeth of said first-mentioned gear, and peripheral teeth for engagement with a source of power, and automatic means for moving said driving gear into and out of engagement with said first-mentioned gear.

In testimony whereof I have signed this specification in the presence of two subscribing witnesses.

GEORGE R. MURRAY.

Witnesses:
A. T. BREWER,
E. M. HALL, Jr.